(12) United States Patent
Choi (10) Patent No.: US 6,991,294 B2
(45) Date of Patent: Jan. 31, 2006

(54) HIGH-RIGIDITY RECLINER FOR VEHICLE

(75) Inventor: Hyung Il Choi, Seoul (KR)

(73) Assignee: Austem Co., Ltd., Cheonan-si (KR)

( * ) Notice: Subject to any disclaimer, the term of this patent is extended or adjusted under 35 U.S.C. 154(b) by 246 days.

(21) Appl. No.: 10/408,005

(22) Filed: Apr. 4, 2003

(65) Prior Publication Data

US 2003/0227206 A1 Dec. 11, 2003

(30) Foreign Application Priority Data

May 31, 2002 (KR) .............................. 10-2002-0030707

(51) Int. Cl.
*B60N 2/02* (2006.01)

(52) U.S. Cl. ....................... 297/367; 297/365; 297/366; 297/368

(58) Field of Classification Search ................. 297/367, 297/365, 366, 368
See application file for complete search history.

(56) References Cited

U.S. PATENT DOCUMENTS

| | | | |
|---|---|---|---|
| 5,685,611 A | * | 11/1997 | Eguchi et al. .............. 297/367 |
| 6,019,430 A | | 2/2000 | Magyar et al. |
| 6,024,410 A | * | 2/2000 | Yoshida .................... 297/301.1 |
| 6,039,400 A | * | 3/2000 | Yoshida et al. ............. 297/367 |
| 6,454,354 B1 | * | 9/2002 | Vossmann et al. .......... 297/367 |
| 6,626,495 B2 | * | 9/2003 | Okazaki et al. ............. 297/367 |
| 6,634,713 B2 | * | 10/2003 | Nonomiya et al. ......... 297/367 |
| 6,648,414 B2 | * | 11/2003 | Ikegaya et al. ............. 297/367 |
| 6,666,515 B2 | * | 12/2003 | Asano et al. ............... 297/366 |

* cited by examiner

*Primary Examiner*—Laurie K. Cranmer
(74) *Attorney, Agent, or Firm*—Schmeiser, Olsen & Watts LLP (57) ABSTRACT

A high-rigidity recliner according to the present invention comprises an upper actuating member attached to a seat base, and a lower actuating member attached to a seat back and is characterized by the upper actuating member supporting a pair of symmetrical lock gears fixedly interposed between a cam and a lower actuating member. Outer gear parts of the lock gears engage inner gear parts of the lower actuating member, whereby any clearances between the outer gear parts and inner gear parts are eliminated and any irregular engagement of the outer and inner gear parts is prevented. The lock gears lock or release the lower actuating member by rotation of the actuating cam. The simple structure of the present invention reduces the number of parts, the time for assembly, and the cost of manufacturing. Additionally, forming the outer and inner gears by blanking improves strength and durability of the recliner.

11 Claims, 9 Drawing Sheets

HIGH-RIGIDITY RECLINER FOR VEHICLE

BACKGROUND OF THE INVENTION

1. Field of the Invention

The present invention relates to a high-rigidity recliner mounted in a seat for a vehicle, and more particularly to a high-rigidity recliner comprising a pair of symmetrical lock gears fixedly interposed between a cam and a lower actuating member, outer gear parts of the lock gears being engaged with inner gear parts, respectively, so that any clearances between the outer gear parts and the corresponding inner gear parts are eliminated and any irregular engagement of the outer and inner gear parts is prevented, the outer gear parts of the lock gears being formed by means of blanking so that the outer gear parts have high strength.

2. Description of the Related Art

As well known to those skilled in the art, one or more seats are provided in a vehicle, on which a driver or a passenger sits comfortably. In the seat are mounted a pair of seat fixing bases actuated by means of a lever for moving a seat back and forth, and a recliner mounted to the rear end of one of the seat fixing bases for rotating the back of the seat back and forth. The recliner is used for the driver or the passenger to adjust a rotational position of the back of the seat based on his/her body form.

The aforesaid recliner is usually mounted to one side of the seat fixing base to which an actuating lever is attached. When the vehicle collides with another vehicle or any structure, the back of the seat leans forward. At this time, the back of the seat attached to the seat fixing base where the recliner is not provided leans forward, whereas the back of the seat attached to the seat fixing base where the recliner is provided does not lean forward. As a result, a rotational force is generated about the recliner, and thus a repulsive force and the rotational force are applied to the back of the seat when the driver or the passenger is pushed forwardly.

Figure 7:
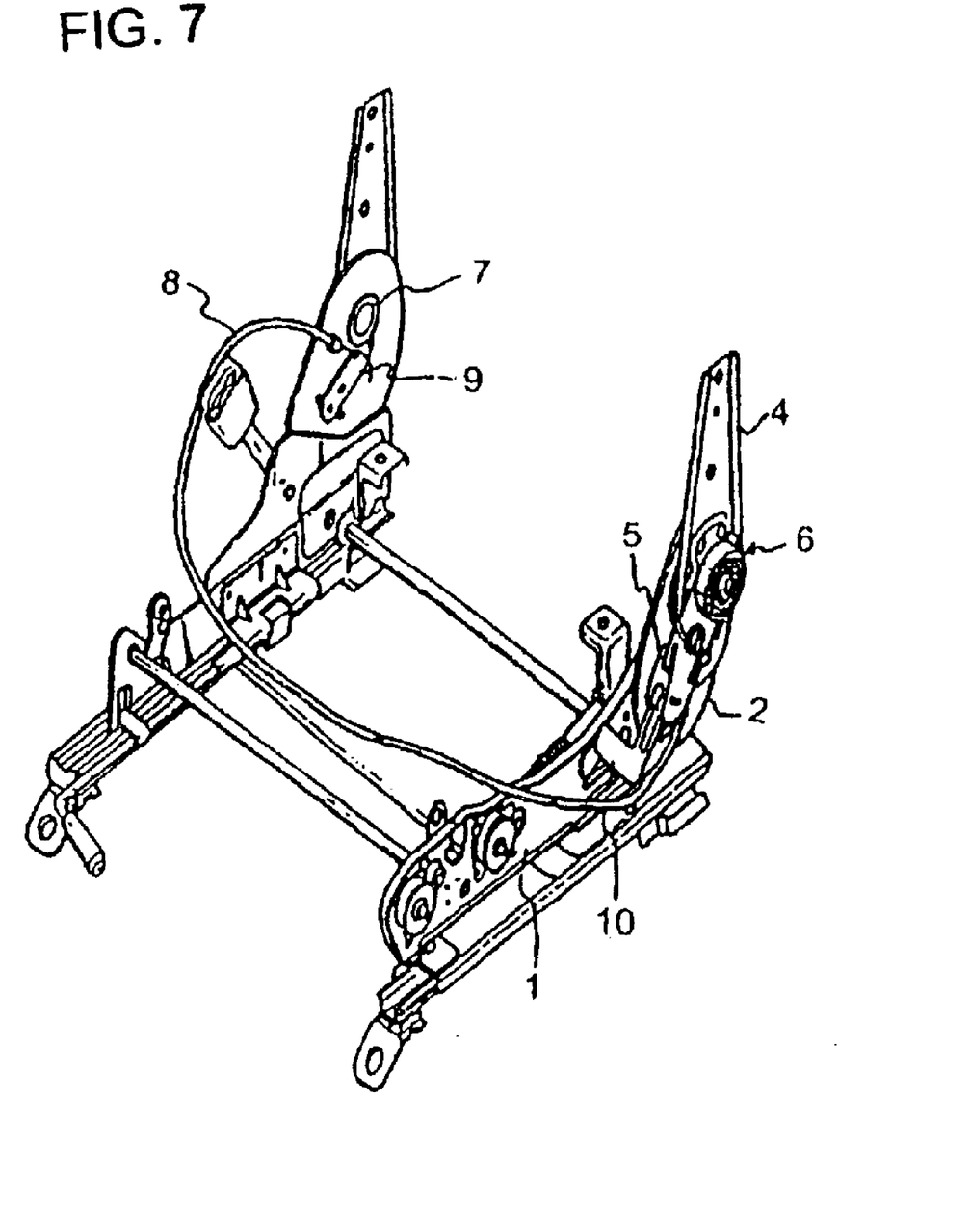
FIG. 7 is a perspective view of a conventional recliner showing a cable connected between two opposite links of the recliner.

A recliner as shown in FIG. 7 has been proposed in order to solve the aforesaid problems. As shown in FIG. 7, seat fixing bases 1 are provided at both sides of a seat (not shown), and lower fixing members 2 are attached to the rear ends of the seat fixing bases 1, respectively. To the lower fixing members 2 are pivotably attached upper fixing members 4 for controlling a rotating movement of the back of the seat. The recliner comprises a main recliner part 6, to which an actuating lever 10 for adjusting a lock mechanism 5, and a sub recliner part 7 connected to the main recliner part 6 via a cable 8 so that the main and sub recliner parts 6 and 7 are operated simultaneously by means of a link 9.

As described above, the main recliner part 6 and the sub recliner part 7 are operated simultaneously by a tension of the cable 8 connected between the main recliner part 6 and the sub recliner part 7, which requires precise adjustment of the tension of the cable when the cable 8 is assembled into the recliner. Furthermore, if the cable 8 is impacted as the vehicle collides with another vehicle or any structure, a fixing force of the cable 8 at the sub recliner part 7 is released. Consequently, only the main recliner part 6 is operated, with the result that the sub recliner part 7 is rotated about the main recliner part 6.

Figure 8:
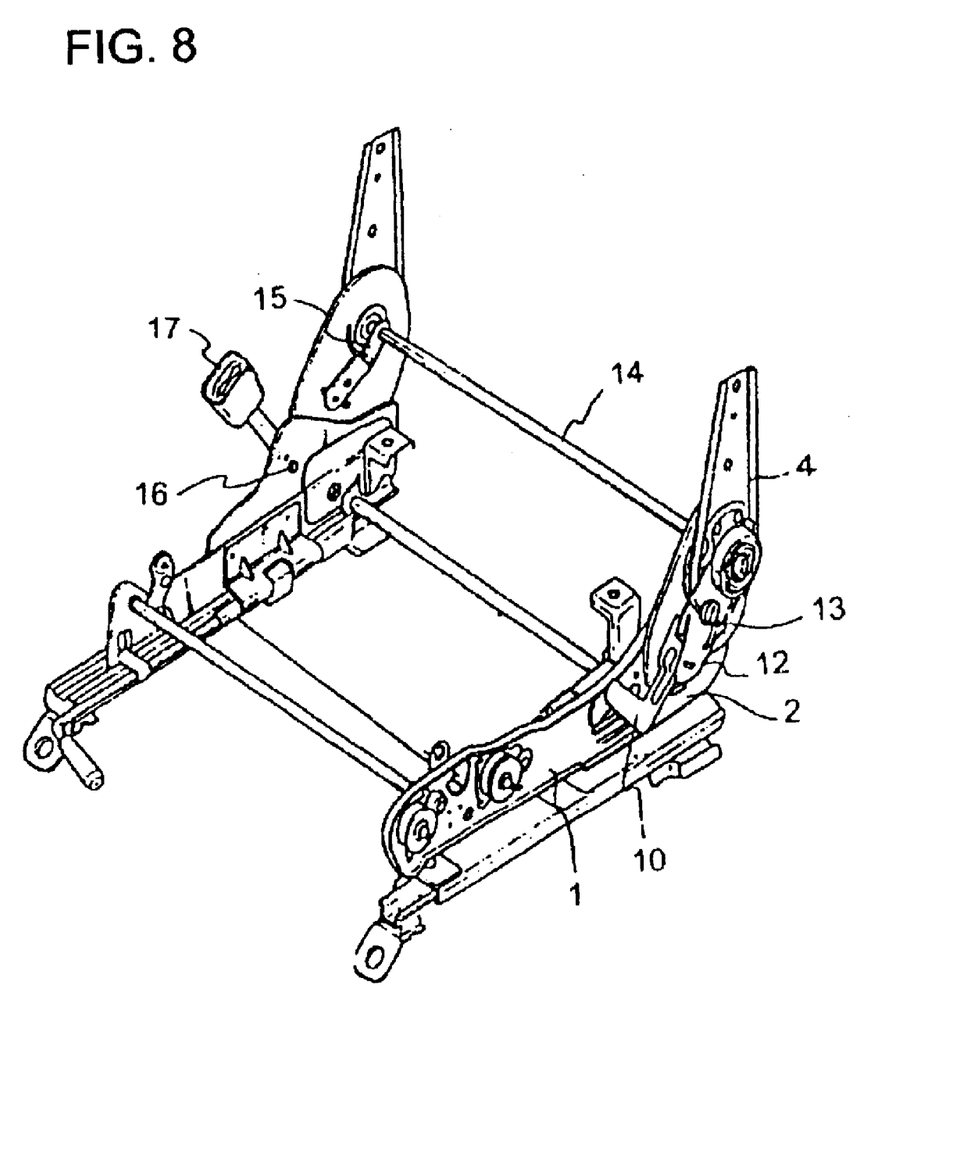
FIG. 8 is a perspective view of another conventional recliner showing a shaft connected between two opposite links of the recliner.

A recliner as shown in FIG. 8 has been proposed to solve the problems caused by the recliner constructed as shown in FIG. 7. As shown in FIG. 7, lower fixing members 2 are attached to the rear ends of seat fixing bases 1, respectively. To the lower fixing members 2 are pivotably attached upper fixing members 4 for controlling a rotating movement of the back of the seat. The recliner comprises a first recliner part having a lower gear 12 rotated by means of a rotational movement of a cam 13 effected by an actuating lever 10 for controlling a rotating movement of the back of the seat, and a second recliner part connected to the first recliner part via a shaft 14. The second recliner part has a link 15, by which the second recliner part can be cooperated with the first recliner part. At one of the seat fixing bases 1 is provided a nut hole 16, which is close to the lower fixing member 2. A safety belt 17 is fixed to the seat fixing base 1 by means of the nut hole 16.

As described above, the recliner is very complicated in its structure, with the result that the assembly of the recliner is difficult and the cost for manufacturing the recliner is increased. Furthermore, the nut hole provided for fixing the safety belt is formed at the front part of the seat fixing base due to the structure of the lower fixing member. Consequently, the safety belt does not function effectively when the vehicle collides with another vehicle or any structure.

Figure 9:
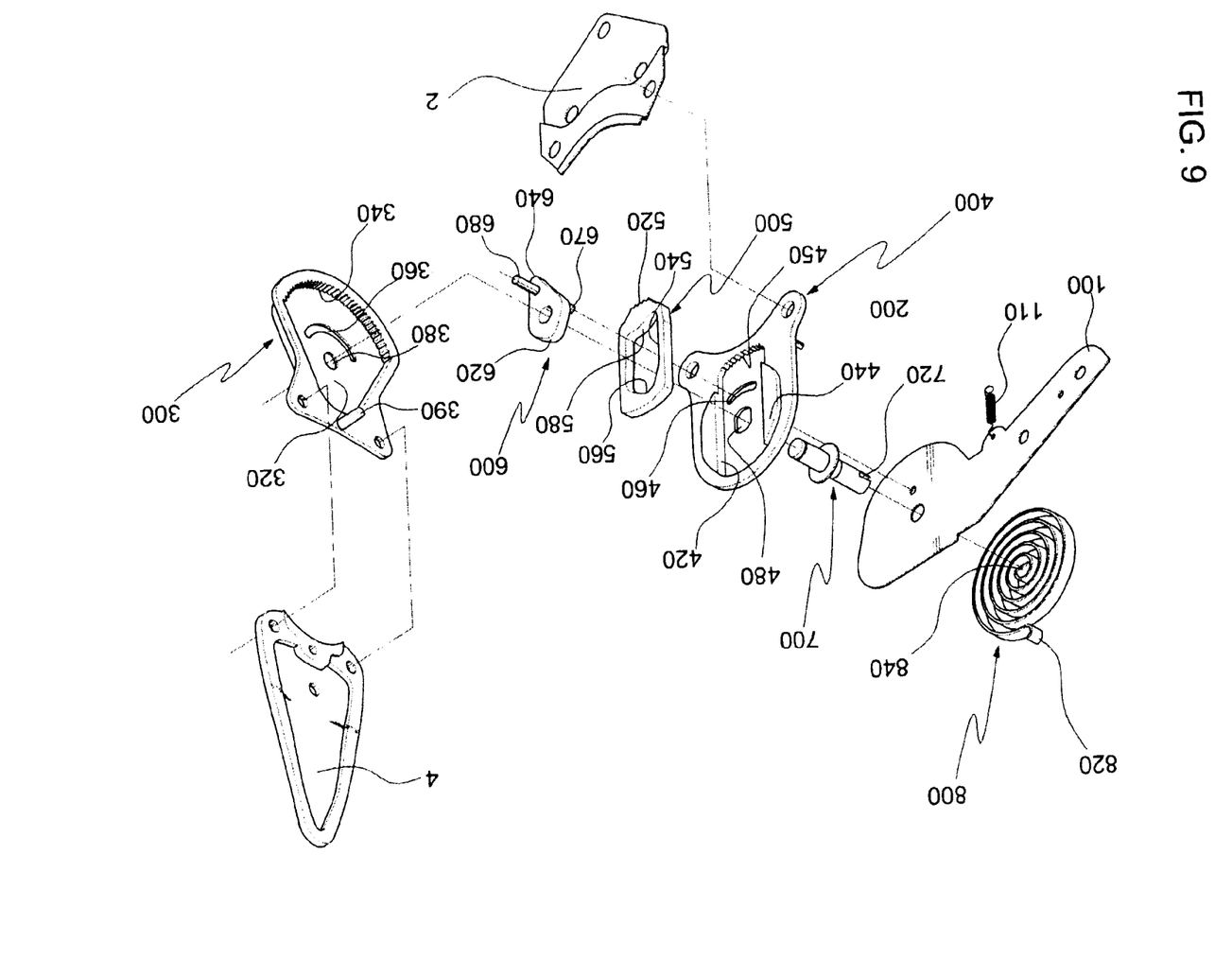
FIG. 9 is an exploded perspective view of still another conventional recliner.
Figure 10:
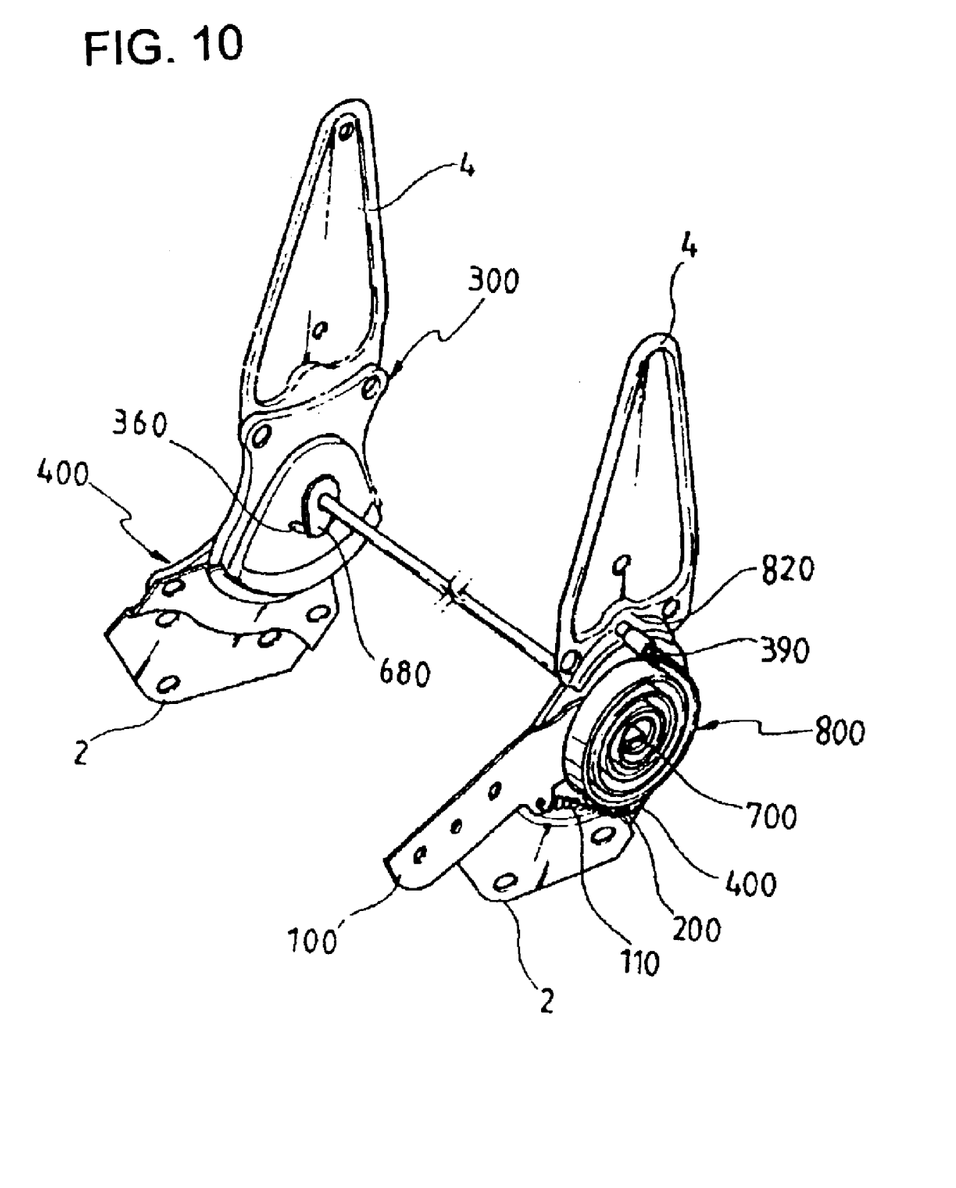
FIG. 10 is an assembled perspective view of the recliner of FIG. 9.

Therefore, a recliner as shown in FIGS. 9 and 10 has been proposed in order to solve the aforesaid problems. As shown in FIGS. 9 and 10, the recliner comprises: a lock gear guiding groove 320 formed inside an upper actuating member 300 by means of blanking, in which a lock gear 500 is operatively arranged; an inner gear part 340 formed on the lower inner edge of the lock gear guiding groove 320 by means of the aforesaid blanking, the lock gear 500 being engaged with the inner gear part 340; a lock gear actuating groove 420 formed inside a lower supporting member 400 by means of the aforesaid blanking; an inner gear part 450 formed on the lower inner edge of the lock gear actuating groove 420 by means of the aforesaid blanking; a reinforcing portion 440 protruded from the lower supporting member 400, the reinforcing portions 440 being inserted into the lock gear guiding groove 320 of the upper actuating member 300, the lock gear 500 being actuated vertically by means of an actuating cam 600 in the lock gear actuating groove 420 of the lower supporting member 400; and a cam hole 540 formed in the lock gear 500, the cam hole 540 having a top end surface 560 and a bottom end surface 580, the top end surface 560 being in contact with a top end 620 of the actuating cam 600 and the bottom end surface 580 being in contact with a bottom end 640 of the actuating cam 600, the actuating cam 600 actuating vertically in the cam hole 540 of the lock gear 500.

The upper actuating member 300 and the lower supporting member 400 are securely fixed to each other by means of the lock gear 500, and the lock gear is actuated in the lock gear guiding groove 320 of the upper actuating member 300 and the lock gear actuating groove 420 of the lower supporting member 400. Consequently, twisting from side to side is reduced as compared to other conventional recliners even when any impact is applied to the recliner as the vehicle collides with another vehicle from the front or from behind, and thus any breakage of the lock gear 500 is prevented. Since the lock gear 500 and the actuating cam 600 are operated only by means of a shaft 700 in the lower supporting member 400, however, there is a clearance between the lock gear 500 and the actuating cam 600, which causes noise and vibration.

Furthermore, an outer gear part 520 is engaged with the inner gear part 450 of the lower supporting member 400 as well as the inner gear part 340 of the upper actuating member 300. Consequently, the assembly operation of the recliner is very difficult, and the engagement of the gear parts may be irregular, which also causes noise and vibration.

SUMMARY OF THE INVENTION

Therefore, the present invention has been made in view of the above problems, and it is an object of the present invention to provide a high-rigidity recliner for a vehicle, comprising a pair of symmetrical lock gears fixedly interposed between a cam and a lower actuating member, outer gear parts of the lock gears being engaged with circular inner gear parts, respectively, so that any clearances between the outer gear parts and the corresponding inner gear parts are eliminated and any irregular engagement of the outer and inner gear parts is prevented, the outer gear parts of the lock gears being formed by means of blanking so that the outer gear parts have high strength, whereby the durability of the recliner is improved.

In accordance with the present invention, the above and other objects can be accomplished by the provision of a high-rigidity recliner for a vehicle, comprising: an upper actuating member fixedly attached to a lower fixing member connected to a seat fixing base, the upper actuating member having a pair of first symmetrical supporting members and a pair of second symmetrical supporting members for supporting a cam and first and second lock gears, and an actuating pin guiding hole formed therethrough; a lower actuating member fixedly attached to an upper fixing member provided to fix a back of a seat, the lower actuating member having an inner receiving section and an outer receiving section, the lower actuating member being in surface contact with the upper actuating member; an actuating cam interposed between the upper actuating member and the lower actuating member, the actuating cam being fitted on the circumference of a shaft; and the first and second lock gears fixedly interposed between the lower actuating member and the actuating cam, the first and second lock gears having outer gear parts disposed in the inner receiving section of the lower actuating member, first supporting member contact surfaces, second supporting member contact surfaces, first cam contact surfaces, and second cam contact surfaces, respectively, wherein the first and second lock gears lock or release the lower actuating member by rotation of the actuating cam.

Preferably, the outer gear parts of the first and second lock gears 40 and 50 may be formed by means of blanking.

Preferably, the inner gear part may be integrally formed with the lower actuating member by means of blanking so that the inner receiving section and the outer receiving section are partitioned by the inner gear part.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
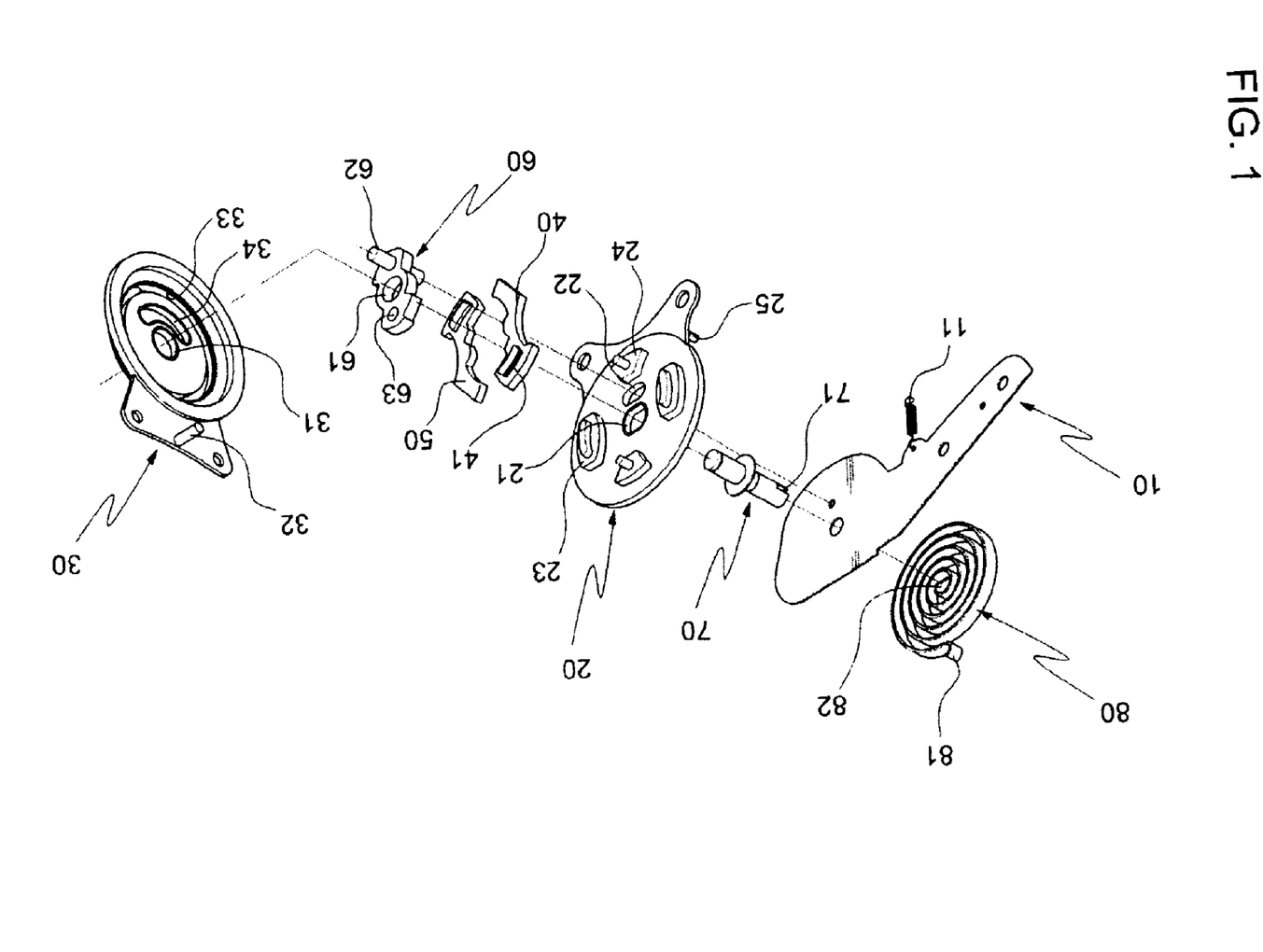
FIG. 1 is an exploded perspective view of a recliner according to the present invention.
Figure 2:
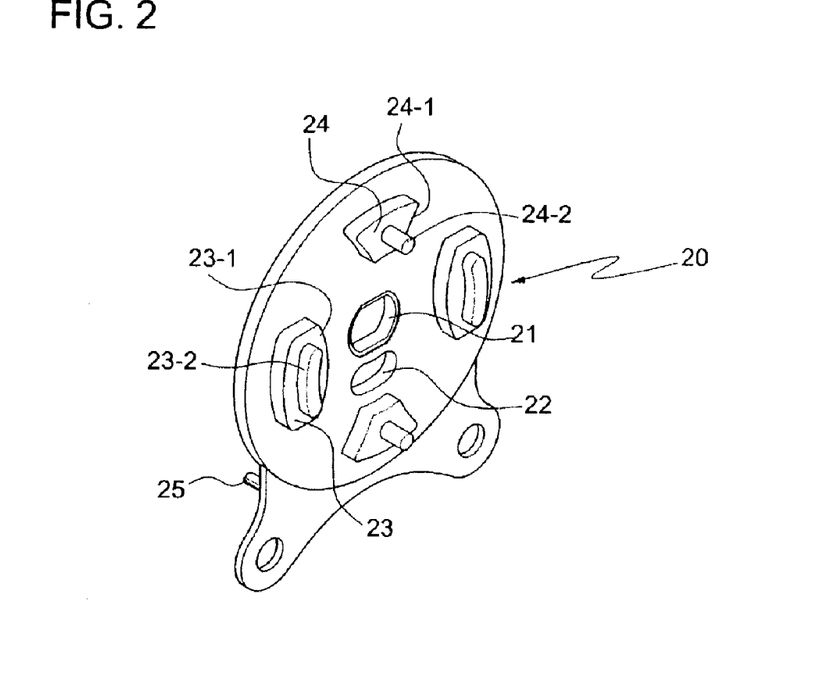
FIG. 2 is a perspective view of an upper actuating member of the recliner according to the present invention.
Figure 3:
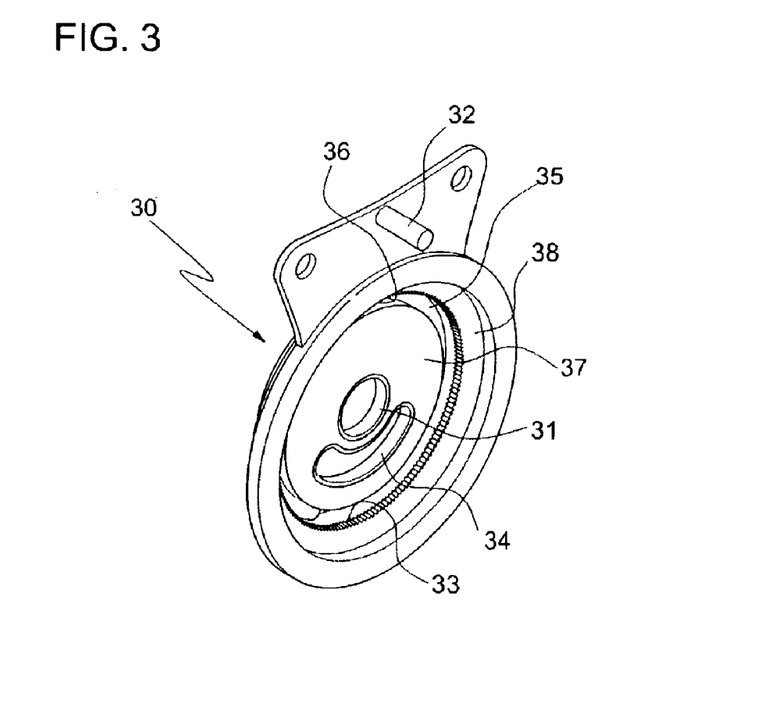
FIG. 3 is a perspective view of a lower actuating member of the recliner according to the present invention.
Figure 4:
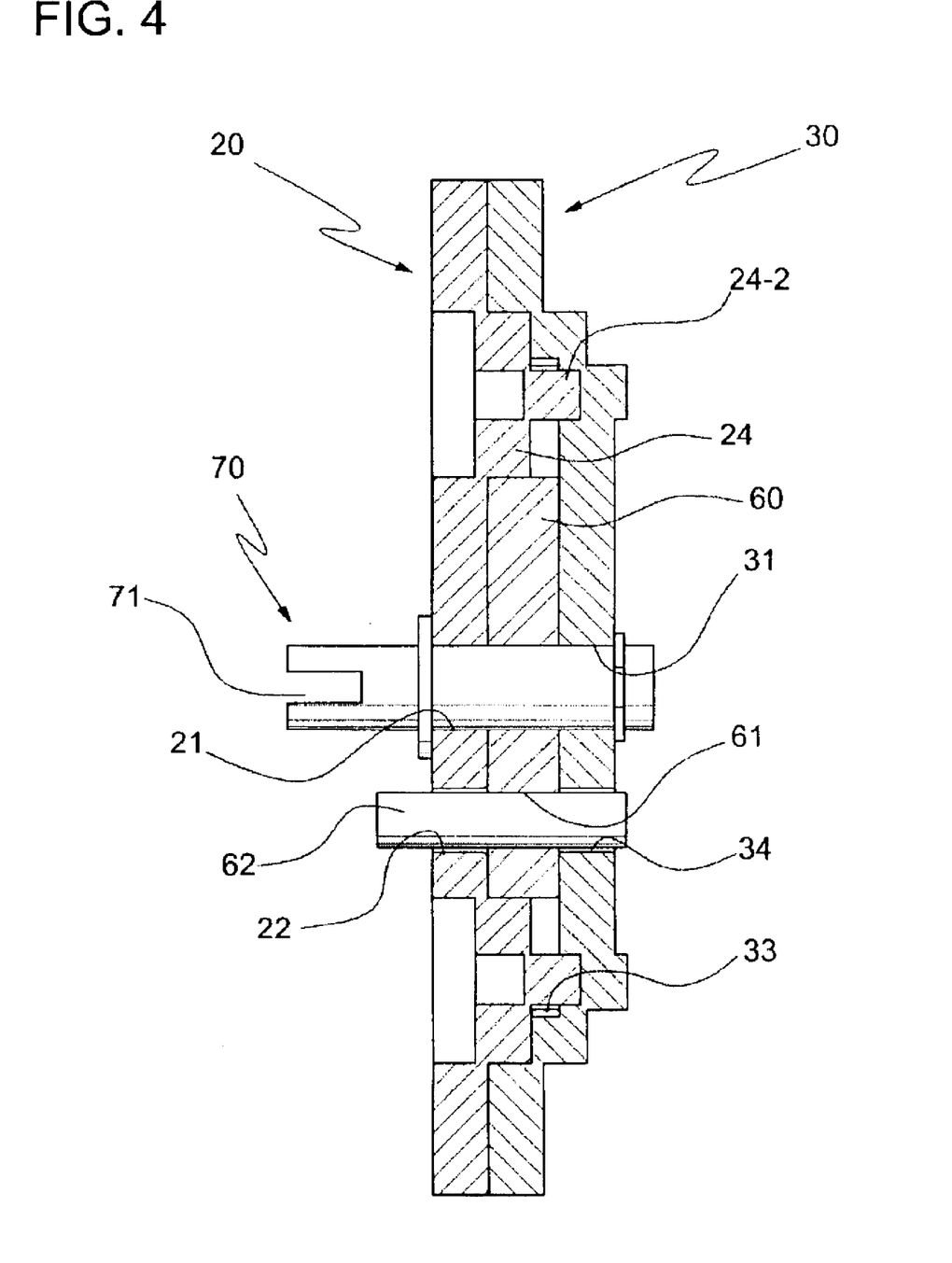
FIG. 4 is an assembled cross sectional view of the recliner according to the present invention.

FIG. 1 is an exploded perspective view of a recliner according to the present invention, FIG. 2 is a perspective view of an upper actuating member of the recliner according to the present invention, FIG. 3 is a perspective view of a lower actuating member of the recliner according to the present invention, and FIG. 4 is an assembled cross sectional view of the recliner according to the present invention. As shown in FIGS. 1 to 4, the recliner according to the present invention comprises an upper actuating member 20 fixedly attached to a lower fixing member (not shown) connected to a seat fixing base (not shown), which is provided to fix a seat (not shown); a lower actuating member 30 fixedly attached to an upper fixing member (not shown), which is provided to fix a back of the seat, the lower actuating member 30 being in surface contact with the upper actuating member 20; an actuating cam 60 interposed between the upper actuating member 20 and the lower actuating member 30, the actuating cam 60 being fitted on the circumference of a shaft 70; and a first lock gear 40 and a second lock gear 50 fixedly interposed between the lower actuating member 30 and the actuating cam 60, the first and second lock gears 40 and 50 locking or releasing the lower actuating member 30 by rotation of the actuating cam 60.

The upper actuating member 20 and the lower actuating member 30 are fitted on the circumference of the shaft 70 to control a rotating movement of the back of the seat. Inside the upper actuating member 20 are mounted a pair of first symmetrical supporting members 23 and a pair of second symmetrical supporting members 24 for supporting the cam 60 and the first and second lock gears 40 and 50. An actuating pin guiding hole 22 is formed through the upper actuating member 20 between a through hole 21 for the shaft 70 and one of the second supporting members 24. A lever actuating pin 62 of the actuating cam 60 is inserted through the actuating pin guiding slit 22. The lever actuating pin 62 enables a turning movement of a link (not shown).

Each of the first supporting members 23 has a rounded supporting base part 23-1 and a first arched turning projection part 23-2 extended from the rounded supporting base part 23-1. Each of the second supporting members 24 has a tapered supporting base part 24-2 and a second circular turning projection part 24-2. The first turning projection part 23-2 is longer than the second turning projection part 24-2.

The lower actuating member 30 locks or releases the seat via the lock gears 40 and 50 after the rotational position of the back of the seat is adjusted. The lower actuating member 30 has a shaft hole 31, a spring fixing pin 32, an inner gear part 33, an actuating pin guiding slit 34, first and second turning projection receiving grooves 35 and 36, an inner receiving section 37, and an outer receiving section 38. One end of the shaft 70 is inserted through the shaft hole 31, and the other end of the shaft 70 is fitted with a fixing portion 82 of a spring 80 so that the shaft 70 is rotated only in one direction.

The inner gear part 33 is integrally formed with the lower actuating member 30 by means of blanking in such a manner that the inner receiving section 37 and the outer receiving section 38 are partitioned by the inner gear part 33. In the inner receiving section 37 are accommodated an outer gear part 41 of the first lock gear 40, and an outer gear part 51 of the second lock gear 50. The turning projections 23-2 and 24-2 are fitted into the first and second turning projection receiving grooves 35 and 36, respectively, so that the upper actuating member 20 is combined with the lower actuating member 30. The first turning projection receiving groove 35 is deeper than the second turning projection receiving groove 36 so that the first turning projection 23-2 is turned only in the first turning projection receiving groove 35.

The upper actuating member 20 is fixedly attached to the lower actuating member 30 by means of the first and second lock gears 40 and 50 so that the seat is not moved. The first lock gear 40 has the outer gear part 41 engaged with the inner gear part 33 of the lower actuating member 30, a first supporting member contact surface 42, a second supporting member contact surface 43, a first cam contact surface 44, and a second cam contact surface 45. Similarly, The second lock gear 50 has the outer gear part 51 engaged with the inner gear part 33 of the lower actuating member 30, a first supporting member contact surface 52, a second supporting member contact surface 53, a first cam contact surface 54, and a second cam contact surface 55.

The outer gear parts 41 and 51 are formed integrally with the first and second lock gears 40 and 50, respectively, by means of blanking so that the outer gear parts 41 and 51 have high strength and improved durability, respectively.

The actuating cam 60 has a shaft hole 61, the lever actuating pin 62, a pin hole 63, a first lock gear contact surface 64, and a second lock gear contact surface 65. The actuating cam 60 fitted on the circumference of the shaft 70 is actuated by operation of the actuating lever 10. At this time, the first and second lock gears 40 and 50 securely locked by the actuating cam 60 and the first and second supporting member 23 and 34 loosen so that the inner gear part 33 of the lower actuating member 30 is disengaged from the outer gear parts 41 and 51 of the first and second lock gears 40 and 50. In reverse sequence, the first and second lock gears 40 and 50 are securely locked again by the actuating cam 60 and the first and second supporting member 23 and 34, and thus the inner gear part 33 of the lower actuating member 30 is engaged with the outer gear parts 41 and 51 of the first and second lock gears 40 and 50.

One end of the shaft 70 is inserted through the shaft hole 31 of the lower actuating member 30. On the middle part of the shaft 70 is fitted the actuating lever 10, and at the other end of the shaft 70 is formed an insertion groove 72, into which the fixing portion 82 of the spring 80 is fitted. The spring also has a hook portion 81, which is hooked by the spring fixing pin 32 of the lower actuating member 30 in such a manner that the lower actuating member 30 forwardly transmits an elastic force.

Figure 5:
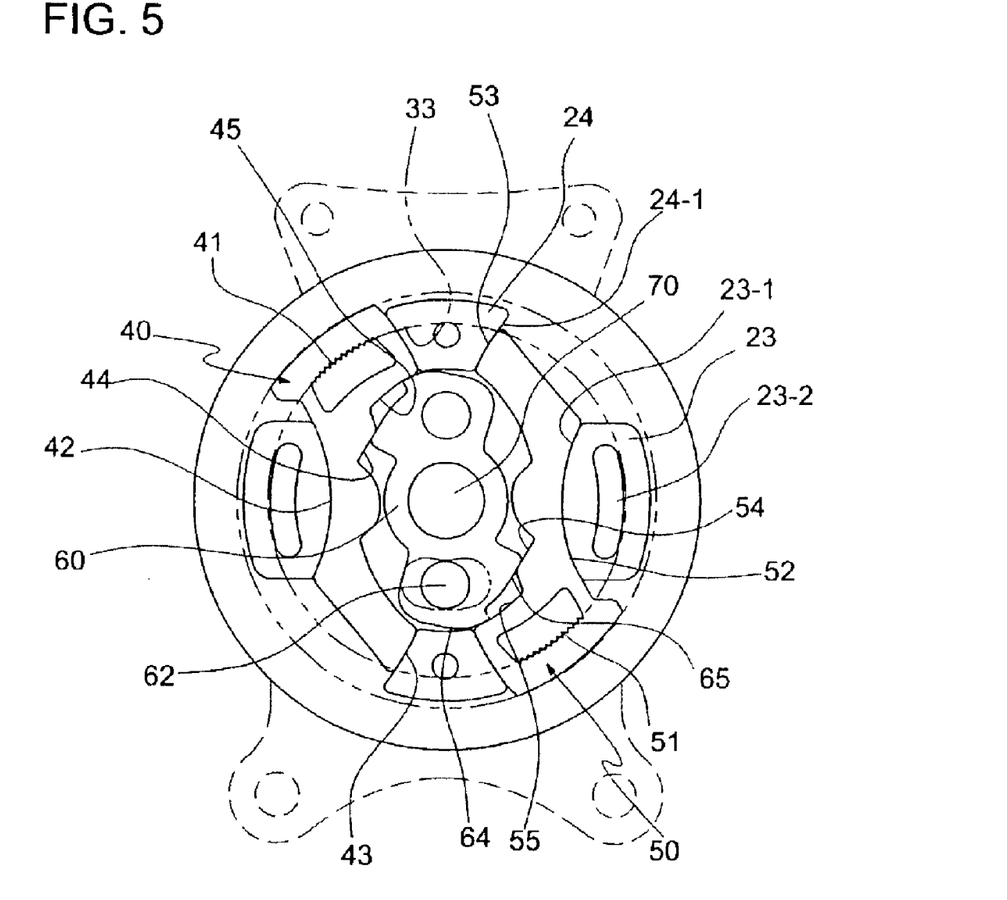
FIG. 5 is a plan view showing the recliner according to the present invention in a locked state.
Figure 6:
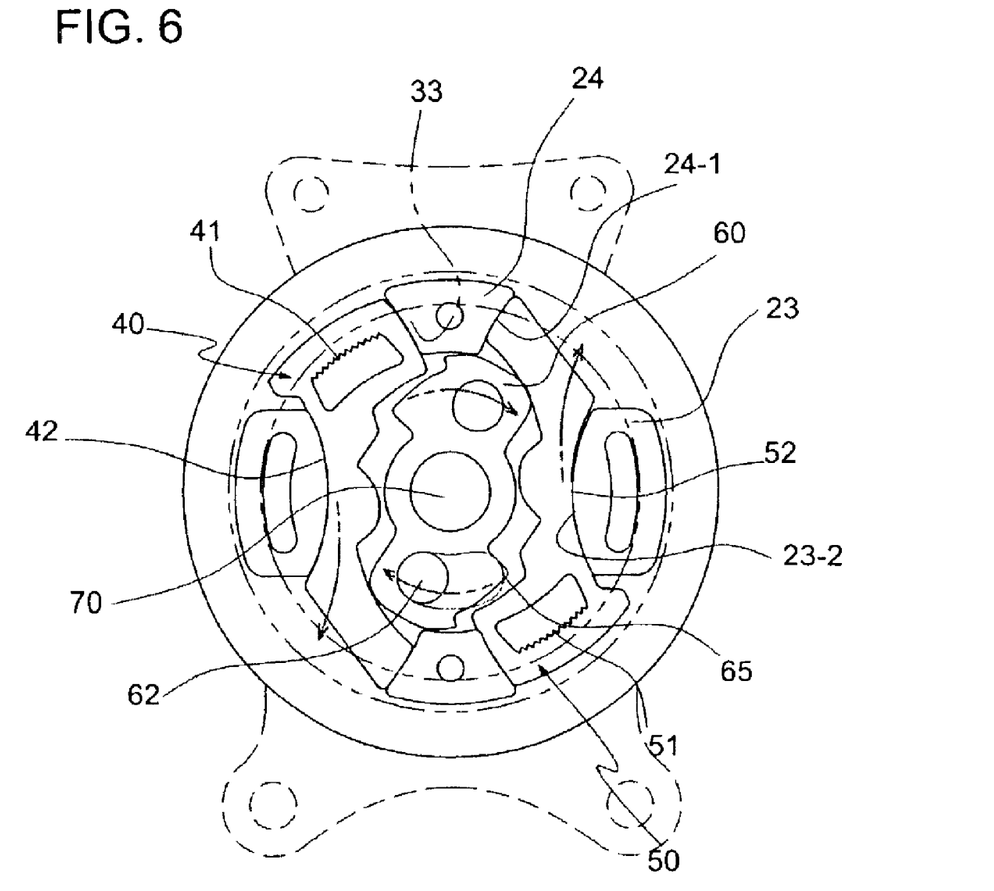
FIG. 6 is a plan view showing the recliner according to the present invention when its locked state is released.

The first and second lock gears 40 and 50 are turned along the guiding surface of the actuating cam 60 so the outer gear parts 41 and 51 of the first and second lock gears 40 and 50 are engaged with the inner gear part 33 of the lower actuating member 30. The lower actuating member 30 is locked by engagement of the inner gear part 33 of the lower actuating member 30 with the outer gear parts 41 and 51 of the first and second lock gears 40 and 50, and the lower actuating member 30 is released by disengagement of the inner gear part 33 of the lower actuating member 30 from the outer gear parts 41 and 51 of the first and second lock gears 40 and 50.

Adjustment of a rotational position of the back of the seat using the recliner with the afore-stated construction according to the present invention will now be described. If the actuating lever 10 is rotated upwardly about the shaft 70, the lever actuating pin 62 fixedly attached to the actuating lever 10 is rotated clockwise about the shaft 70. At this time, the first cam contact surfaces 44 and 54 of the first and second lock gears 40 and 50 are separated from the first lock gear contact surface 64 and the second lock gear contact surface 65 of the cam, respectively, so that the outer gear parts 41 and 51 of the first and second lock gears 40 and 50 are disengaged from the inner gear part 33 of the lower actuating member 30. Consequently, the coupling between the upper actuating member 20 and the lower actuating member 30 is released.

If the cam 60 is rotated by means of the actuating lever 10, the link is turned by means of the link actuating pin 62, by which the link actuating pin 62 and the actuating cam 60 are rotated forwardly. By means of the rotating movement of the actuating cam 60, the first and second lock gears 40 and 50 are separated from the lower actuating member 30. Consequently, the coupling between the upper actuating member 20 and the lower actuating member 30 is released.

When the actuating lever 10 is rotated upwardly, a tension spring 11 of the actuating lever 10 fixed to a spring fixing pin 25 of the upper actuating member 20 is extended.

If the actuating lever 10 is released after the rotational position of the back of the seat is properly adjusted while the coupling between the upper actuating member 20 fixedly attached to the seat fixing base and the lower actuating member 30 fixedly attached to the back of the seat is released, the actuating lever 10 is rotated downwardly by means of the restoring force of the tension spring 11. At the same time, the lever actuating pin 62 of the actuating cam 60 is rotated counterclockwise about the shaft 70 to rotate the actuating cam 60. Consequently, the first and second lock gears 40 and 50 are pushed outwardly to fit into the actuating cam 60 and the first and second supporting member 23 and 24 so that the outer gear parts 41 and 51 of the first and second lock gears 40 and 50 are securely engaged with the inner gear part 33 of the lower actuating member 30, and thus the back of the seat is securely fixed without shaking.

The outer gear parts 41 and 51 of the first and second lock gears 40 and 50, which are formed by means of blanking, have higher strength than the conventional gear parts formed by cutting an iron plate. That is, the outer gear parts 41 and 51 according to the present invention are formed by means of forging, which provides an effect of increased strain resistance.

As apparent from the above description, the present invention provides a high-rigidity recliner comprising a pair of symmetrical lock gears fixedly interposed between a cam and a lower actuating member, outer gear parts of the lock gears being engaged with inner gear parts, respectively, whereby any clearances between the outer gear parts and the corresponding inner gear parts are eliminated and any irregular engagement of the outer and inner gear parts is prevented. Furthermore, the high-rigidity recliner according to the present invention has a simple structure, which reduces the number of the parts, whereby not only the time for assembly is reduced, but the cost for manufacturing the recliner is reduced as well. Particularly, the outer gear parts of the lock gears is formed by means of blanking so that the outer gear parts have high strength, whereby the durability of the recliner is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-rigidity recliner for a vehicle, comprising:
an upper actuating member fixedly attached to a lower fixing member connected to a seat fixing base, the upper actuating member having a pair of first symmetrical supporting members and a pair of second symmetrical supporting members for supporting a cam and first and second lock gears, the upper actuating member having a seat axis shaft hole and an actuating pin guiding hole formed therethrough;
a lower actuating member fixedly attached to an upper fixing member provided to fix a back of a seat, the lower actuating member having an inner receiving section and an outer receiving section, the lower actuating member being in surface contact with the upper actuating member;
an actuating cam interposed between the upper actuating member and the lower actuating member, the actuating cam being fitted on the circumference of a shaft; and
the first and second lock gears fixedly interposed between the lower actuating member and the actuating cam, the first and second lock gears having outer gear parts disposed in the inner receiving section of the lower actuating member, first supporting member contact surfaces, second supporting member contact surfaces, first cam contact surfaces, and second cam contact surfaces, respectively,
wherein the first and second lock gears lock or release the lower actuating member by rotation of the actuating cam.

2. The recliner as set forth in claim 1, wherein the outer gear parts are blanked outer gear parts having enhanced strength.

3. The recliner as set forth in claim 1, further comprising a blanked inner gear part having enhanced strength integrally formed with the lower actuating member so that the inner receiving section and the outer receiving section are partitioned by the inner gear part.

4. A recliner for a vehicle, comprising:
an upper actuating member adapted to be fixed to a seat bottom of a vehicle, the upper actuating member having at least one supporting member with a radially inwardly facing convex portion and a radially inwardly facing concave portion;
a lower actuating member adapted to be fixed to a seat backrest of a vehicle, the lower actuating member having an inner receiving section receiving the at least one supporting member of the upper actuating member in an assembled state;
an actuating cam interposed between the upper actuating member and the lower actuating member, the actuating cam being fitted on the circumference of a shaft; and
at least one lock gear movably interposed between the supporting member of the upper actuating member and the actuating cam, the lock gear being in guiding contact with the radially inwardly convex portion of the supporting member.

5. The recliner of claim 4, wherein:
the supporting member is one of a pair of similar supporting members that are symmetrically disposed on the upper actuating member relative to a central axis of the shaft;
the at least one lock gear is one of a pair of lock gears that are each disposed in guiding contact with respective radially inwardly convex portions of the supporting members on opposite sides of the central axis; and
the actuating cam is interposed between the lock gears.

6. The recliner of claim 4, further comprising:
a seat axis shaft hole through the upper actuating member, the seat axis shaft hole receiving the shaft; and
a pin fixed to the actuating cam at a position radially outward from the shaft.

7. The recliner of claim 6, further comprising an arcuate actuating pin guiding hole in the upper actuating member spaced radially outward from the shaft hole, the arcuate pin guiding hole receiving the pin in the assembled state.

8. A recliner for a vehicle, comprising:
an upper actuating member adapted to be fixed to a seat of a vehicle and rotatable about a first axis of seat back rotation, the upper actuating member having at least one supporting member with a radially inwardly facing convex portion;
a lower actuating member adapted to be fixed to a backrest of a vehicle, the lower actuating member having an inner receiving section receiving the at least one supporting member of the upper actuating member in an assembled state;
an actuating cam interposed between the upper actuating member and the lower actuating member, the actuating cam being fitted on the circumference of a shaft; and
at least one lock gear movably interposed between the supporting member of the upper actuating member and the actuating cam, the lock gear being in guiding contact with the radially inwardly convex portion of the supporting member;
wherein a generally planar surface of the actuating cam engages a generally planar surface of the lock gear in a locking configuration that inhibits rotational movement between the upper actuating member and the lower actuating member.

9. The recliner of claim 8, wherein:
the supporting member is one of a pair of similar supporting members that are symmetrically disposed on the upper actuating member relative to a central axis of the shaft;
the at least one lock gear is one of a pair of lock gears that are each disposed in guiding contact with respective radially inwardly convex portions of the supporting members on opposite sides of the central axis; and
the actuating cam is interposed between the lock gears.

10. The recliner of claim 9, wherein each of the supporting members, the actuating cam, and the lock gears are configured and positioned such that clockwise rotation of the actuating cam causes clockwise arcuate movement of both of the lock gears along respective arcuate surfaces of the radially inwardly convex portions of the supporting members.

11. The recliner of claim 8, wherein the supporting member, the actuating cam, and the lock gear are configured and positioned such that clockwise rotation of the actuating cam causes clockwise arcuate movement of the lock gear along an arcuate surface of the radially inwardly convex portion of the supporting member.

* * * * *